United States Patent
Ali et al.

(10) Patent No.: US 7,660,802 B2
(45) Date of Patent: *Feb. 9, 2010

(54) METHOD AND APPARATUS FOR GENERATING COMPONENTS FOR PATTERN-BASED SYSTEM DESIGN ANALYSIS USING A CHARACTERISTICS MODEL

(75) Inventors: Syed M. Ali, Menlo Park, CA (US); Yury Kamen, Menlo Park, CA (US); Deepak Alur, Fremont, CA (US); John P. Crupi, Bethesda, MD (US); Daniel B. Malks, Arlington, VA (US)

(73) Assignee: Sun Microsystems, Inc., Santa Clara, CA (US)

( * ) Notice: Subject to any disclaimer, the term of this patent is extended or adjusted under 35 U.S.C. 154(b) by 241 days.

This patent is subject to a terminal disclaimer.

(21) Appl. No.: 11/133,717

(22) Filed: May 20, 2005

(65) Prior Publication Data

US 2006/0265346 A1 Nov. 23, 2006

(51) Int. Cl.
G06F 7/00 (2006.01)
G06F 17/00 (2006.01)
G06F 15/16 (2006.01)

(52) U.S. Cl. ............ 707/100; 707/101; 707/104.1

(58) Field of Classification Search .......... 707/2, 707/3–5, 100–104.1; 709/217, 203–222; 717/174, 120–154; 395/604; 235/385; 715/700–746; 345/418–475

See application file for complete search history.

(56) References Cited

U.S. PATENT DOCUMENTS

| | | | | |
|---|---|---|---|---|
| 4,931,928 A | * | 6/1990 | Greenfeld | 717/131 |
| 5,664,173 A | * | 9/1997 | Fast | 707/4 |
| 5,752,245 A | | 5/1998 | Parrish et al. | |
| 5,812,840 A | | 9/1998 | Shwartz | |
| 5,911,139 A | * | 6/1999 | Jain et al. | 707/3 |
| 6,023,694 A | * | 2/2000 | Kouchi et al. | 707/2 |
| 6,167,564 A | * | 12/2000 | Fontana et al. | 717/104 |
| 6,430,553 B1 | * | 8/2002 | Ferret | 707/3 |
| 6,529,909 B1 | * | 3/2003 | Bowman-Amuah | 707/10 |
| 6,760,903 B1 | | 7/2004 | Morshed et al. | |

(Continued)

FOREIGN PATENT DOCUMENTS

GB  2 383 152 A  6/2003

OTHER PUBLICATIONS

Prof. Victor V. Martynov, EHU; "SEMPL Semantic Patterns Language"; Summary Chapter from the book "Foundations of Semantic Coding", pp. 128-138, EHU, 2001 (9 pages).

(Continued)

*Primary Examiner*—Cam Y Truong
*Assistant Examiner*—Cecile Vo
(74) *Attorney, Agent, or Firm*—Osha • Liang LLP (57) ABSTRACT

A method for analyzing a target system that includes obtaining a characteristics model, generating at least one selected from the group consisting of a schema, characteristics store API, and a characteristics extractor, using the characteristics model, obtaining a plurality of characteristics from the target system using characteristics extractor, wherein each of the plurality of characteristics is associated with the characteristics model, storing each of the plurality of characteristics in the characteristics store using the schema, and analyzing the target system by issuing at least one query to the characteristics store to obtain an analysis result.

13 Claims, 5 Drawing Sheets

U.S. PATENT DOCUMENTS

| | | | |
|---|---|---|---|
| 6,775,680 | B2 * | 8/2004 | Ehrman et al. .............. 707/102 |
| 6,907,546 | B1 * | 6/2005 | Haswell et al. ............... 714/38 |
| 7,085,773 | B2 * | 8/2006 | Dorsett, Jr. ............... 707/104.1 |
| 7,137,100 | B2 * | 11/2006 | Iborra et al. ................ 717/106 |
| 7,213,208 | B2 * | 5/2007 | Reichel et ................... 715/746 |
| 7,243,337 | B1 * | 7/2007 | Cowan ....................... 717/127 |
| 2001/0042067 | A1 | 11/2001 | Dayani-Fard et al. |
| 2003/0172368 | A1 * | 9/2003 | Alumbaugh et al. ........ 717/106 |
| 2003/0200280 | A1 * | 10/2003 | Austin ....................... 709/217 |
| 2004/0093344 | A1 | 5/2004 | Berger et al. |
| 2004/0255291 | A1 * | 12/2004 | Sierer et al. ................ 717/174 |
| 2005/0044197 | A1 | 2/2005 | Lai |
| 2006/0112175 | A1 | 5/2006 | Sellers et al. |
| 2006/0124738 | A1 * | 6/2006 | Wang et al. ................ 235/385 |

OTHER PUBLICATIONS

"Hammurapi Group"; pp. 1-7.

Kamran Sartipi; "Software Architecture Recovery Based on Pattern Matching"; School of Computer Science, University of Waterloo; Proceedings of the International Conference on Software Maintenance (ICSM'03); IEEE Computer Society (4 pages).

Aldrich, et al; "Architectural Reasoning in ArchJava"; Department of Computer Science and Engineering; University of Washington; 2002; pp. 1-34.

"Structural Analysis for Java"; Mar. 1, 2004 (2 pages).

Lovatt, et al.; "A Pattern Enforcing Compiler (PEC) for Java: Using the Compiler"; Department of Computing, Macquarie University; 2005 Australian Computer Society, Inc.; (10 pages).

Hallem, et al.; "Uprooting Software Defects at the Source"; Instant Messaging, vol. 1, No. 8, Nov. 2003; pp. 1-9.

"Fixing Software on the Assembly Line" An Overview of Coverity's Static Code Analysis Technology; (26 pages).

"CAST Application Intelligence Platform Empowering Application Management"; CAST The Application Intelligence Company; Oct. 2004 (2 pages).

Agitar Data Sheet; "Agitator & Management Dashboard"; Agitar Software 2003-2005; (4 pages).

Ellsworth et al; "JUnit+Jtest=Automated Test Case Design and Static Analysis"; (3 pages).

Carriere et al.; "Assessing Design Quality From a Software Architectural Perspective"; OPPSLA '97 Workshop on Object-Oriented Design Quality; Oct. 5, 1997 (4 pages).

"J2EE Code Validation Preview for WebSphere Studio"; (2 pages).

"SQL Compiler (for Java)"; (8 pages).

Hassan et al.; "Architecture Recovery of Web Applications"; The Guide to Computing Literature; International Conference on Software Engineering; 2002; (12 pages).

PCT International Search Report dated Jan. 4, 2006 for PCT/US2005/018004 (4 pages).

PCT International Search Report dated Jan. 4, 2006 for PCT/US2005/018008 (4 pages).

PCT International Search Report dated Jan. 23, 2006 for PCT/US/2005/018003 (4 pages).

Sartipi, K. et al.; "A Pattern Matching Framework for Software Architecture Recovery and Restructuring"; Proceedings IWPC'00; $8^{th}$ International Workshop on Program Comprehension, Jun. 10, 2000, pp. 1-11 (11 pages).

Lange, C. et al.; "Comparing Graph-based Program Comprehension Tools to Relational Database-based Tools"; Program Comprehension, 2001; IWPC 2001 Proceedings; $9^{th}$ International Workshop on May 12-13, 2001, Piscataway, NJ; IEEE 2001; pp. 209-218 (10 pages).

Sartipi, K. et al.; "A Graph Pattern Matching Approach to Software Architecture Recovery"; Proceedings IEEE International Conference on Software Maintenance; ICSM-2001, Florence, Italy, Nov. 7-9, 2001; pp. 408-419(12 pages).

Jarzabek, S.; "Design of Flexible Static Program Analyzers with PQL"; IEEE Transactions on Software Engineering, IEEE Service Center, vol. 24, No. 3, Mar. 1, 1998; pp. 197-215 (19 pages).

Paul, S. et al.; "Source Code Retrieval Using Program Patterns"; Computer-Aided Software Engineering, 1992, Proceedings, Fifth International Workshop, Montreal, Quebec, Canada, Jul. 6-10, 1992; IEEE Computer Science, Jul. 6, 1992; pp. 92-105 (11 pages).

Masiero, P. et al.; "Legacy Systems Reengineering Using Software Patterns"; Computer Science Society, 1999, Proceedings SCCC '99; XIX International Conference of the Chilean Talca, Chile, Nov. 11-13, 1999; IEEE Computer Science; pp. 160-169 (10 pages).

International Search Report dated Feb. 15, 2006 (3 pages).

Atkins, David L.; "Version Sensitive Editing: Change History as a Programming Tool"; System Configuration Management; ECOOP '98, SCM-8 Symposium, Proceedings 1998, Berlin, Germany; pp. 146-157, 1998 (12 pages).

Notification Concerning Transmittal of International Preliminary Report on Patentablility—PCT/US2005/018003 mailed Nov. 23, 2007.

Notification Concerning Transmittal of International Preliminary Report on Patentablility—PCT/US2005/018008 mailed Nov. 23, 2007.

* cited by examiner

METHOD AND APPARATUS FOR GENERATING COMPONENTS FOR PATTERN-BASED SYSTEM DESIGN ANALYSIS USING A CHARACTERISTICS MODEL

CROSS-REFERENCE TO RELATED APPLICATIONS

The present application contains subject matter that may be related to the subject matter in the following U.S. applications filed on May 20, 2005, and assigned to the assignee of the present application: "Method and Apparatus for Tracking Changes in a System" Ser. No. 11/133,831; "Method and Apparatus for Transparent Invocation of a Characteristics Extractor for Pattern-Based System Design Analysis" Ser. No. 11/134,154; "Method and Apparatus for Pattern-Based System Design Analysis" Ser. No. 11/134,062; "Method and Apparatus for Cross-Domain Querying in Pattern-Based System Design Analysis" Ser. No. 11/133,507; "Method and Apparatus for Pattern-Based System Design Analysis Using a Meta Model" Ser. No. 11/134,021; "Pattern Query Language" Ser. No. 11/133,660; and "Method and Apparatus for Generating a Characteristics Model for Pattern-Based System Design Analysis Using a Schema" Ser. No. 11/133,714.

BACKGROUND

As software technology has evolved, new programming languages and increased programming language functionality has been provided. The resulting software developed using this evolving software technology has become more complex. The ability to manage the quality of software applications (including design quality and architecture quality) is becoming increasingly more difficult as a direct result of the increasingly complex software. In an effort to manage the quality of software applications, several software development tools and approaches are now available to aid software developers in managing software application quality. The following is a summary of some of the types of quality management tools currently available.

One common type of quality management tool is used to analyze the source code of the software application to identify errors (or potential errors) in the source code. This type of quality management tool typically includes functionality to parse the source code written in a specific programming language (e.g., Java™, C++, etc.) to determine whether the source code satisfies one or more coding rules (i.e., rules that define how source code in the particular language should be written). Some quality management tools of the aforementioned type have been augmented to also identify various coding constructs that may result in security or reliability issues. While the aforementioned type of quality management tools corrects coding errors, it does not provide the software developer with any functionality to verify the quality of the architecture of software application.

Other quality management tools of the aforementioned type have been augmented to verify that patterns have been properly implemented. Specifically, some quality management tools of the aforementioned type have been augmented to allow the software developer to indicate, in the source code, the type of pattern the developer is using. Then the quality management tool verifies, during compile time, that the pattern was used/implemented correctly.

In another implementation of the aforementioned type of quality management tools, the source code of the software is parsed and the components (e.g., classes, interfaces, etc.) extracted from the parsing are subsequently combined in a relational graph (i.e., a graph linking all (or sub-sets) of the components). In a subsequent step, the software developer generates an architectural design, and then compares the architectural design to the relational graph to determine whether the software application conforms to the architectural pattern. While the aforementioned type of quality management tool enables the software developer to view the relationships present in the software application, it does not provide the software developer with any functionality to conduct independent analysis on the extracted components.

Another common type of quality management tool includes functionality to extract facts (i.e., relationships between components (classes, interfaces, etc.) in the software) and subsequently displays the extracted facts to the software developer. While the aforementioned type of quality management tool enables the software developer to view the relationships present in the software application, it does not provide the developer with any functionality to independently query the facts or any functionality to extract information other than facts from the software application.

Another common type of quality management tool includes functionality to extract and display various statistics (e.g., number of lines of code, new artifacts added, software packages present, etc.) of the software application to the software developer. While the aforementioned type of quality management tool enables the software developer to view the current state of the software application, it does not provide the developer with any functionality to verify the quality of the architecture of the software application.

SUMMARY

In general, in one aspect, the invention relates to a method for analyzing a target system, comprising obtaining a characteristics model, generating at least one selected from the group consisting of a schema, characteristics store API, and a characteristics extractor, using the characteristics model, obtaining a plurality of characteristics from the target system using characteristics extractor, wherein each of the plurality of characteristics is associated with the characteristics model, storing each of the plurality of characteristics in the characteristics store using the schema, and analyzing the target system by issuing at least one query to the characteristics store to obtain an analysis result.

In general, in one aspect, the invention relates to a system, comprising a characteristics model, a target system comprising a plurality of characteristics, at least one characteristics extractor configured to obtain at least one of the plurality of characteristics from the target system, a characteristics store configured to store the at least one of the plurality of characteristics obtained from the target system using a schema and a characteristics store API, and a query engine configured to analyze the target system by issuing at least one query to the characteristics store and configured to obtain an analysis result in response to the at least one query, wherein at least one selected from the group consisting of the schema, the characteristics store API, and the characteristics extractor is generated using the characteristics model.

In general, in one aspect, the invention relates to a computer readable medium comprising software instructions for analyzing a target system, comprising software instructions to obtain a characteristics model, generating at least one selected from the group consisting of a schema, characteristics store API, and a characteristics extractor, using the characteristics model, obtain the plurality of characteristics from the target system using characteristics extractor, wherein each of the plurality of characteristics is associated with the characteristics model, store each of the plurality of characteristics in the characteristics store using the schema, and analyze the target system by issuing at least one query to the characteristics store to obtain an analysis result.

Other aspects of the invention will be apparent from the following description and the appended claims.

DETAILED DESCRIPTION

Exemplary embodiments of the invention will be described with reference to the accompanying drawings. Like items in the drawings are shown with the same reference numbers.

In the exemplary embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for pattern-based system design analysis. More specifically, embodiments of the invention provide a method and apparatus for using one or more characteristics models, one or more characteristics extractors, and a query engine configured to query the characteristics of a target system to analyze the system design. Embodiments of the invention provide the software developer with a fully configurable architectural quality management tool that enables the developer to extract information about the characteristics of the various artifacts in the target system, and then issue queries to determine specific details about the various artifacts including, but not limited to, information such as: number of artifacts of the specific type present in the target system, relationships between the various artifacts in the target system, the interaction of the various artifacts within the target system, the patterns that are used within the target system, etc.

Figure 1:
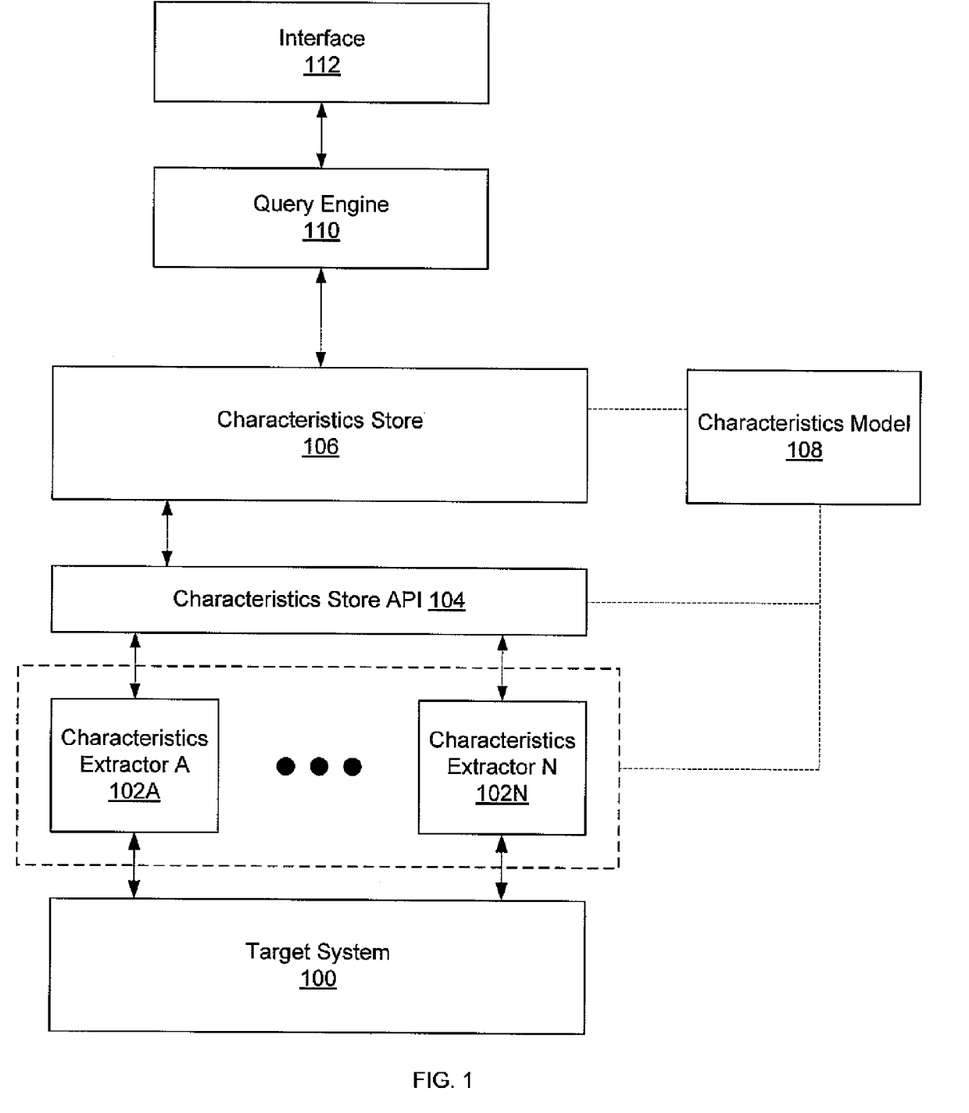
FIG. 1 shows a system in accordance with one embodiment of the invention.

FIG. 1 shows a system in accordance with one embodiment of the invention. The system includes a target system (100) (i.e., the system that is to be analyzed) and a number of components used in the analysis of the target system. In one embodiment of the invention, the target system (100) may correspond to a system that includes software, hardware, or a combination of software and hardware. More specifically, embodiments of the invention enable a user to analyze specific portions of a system or the entire system. Further, embodiments of the invention enable a user to analyze the target system with respect to a specific domain (discussed below). Accordingly, the target system (100) may correspond to any system under analysis where the system may correspond to the entire system including software and hardware, or only a portion of the system (e.g., only the hardware portion, only the software portion, a sub-set of the hardware or software portion, or any combination thereof).

As shown in FIG. 1, the system includes the following components to aid in the analysis of the target system: one or more characteristics extractors (e.g., characteristics extractor A (102A), characteristics extractor N (102N)), a characteristics store application programming interface (API) (104), a characteristics store (106), a characteristics model (108), a query engine (110), and interface (112). Each of these components is described below.

Figure 2:
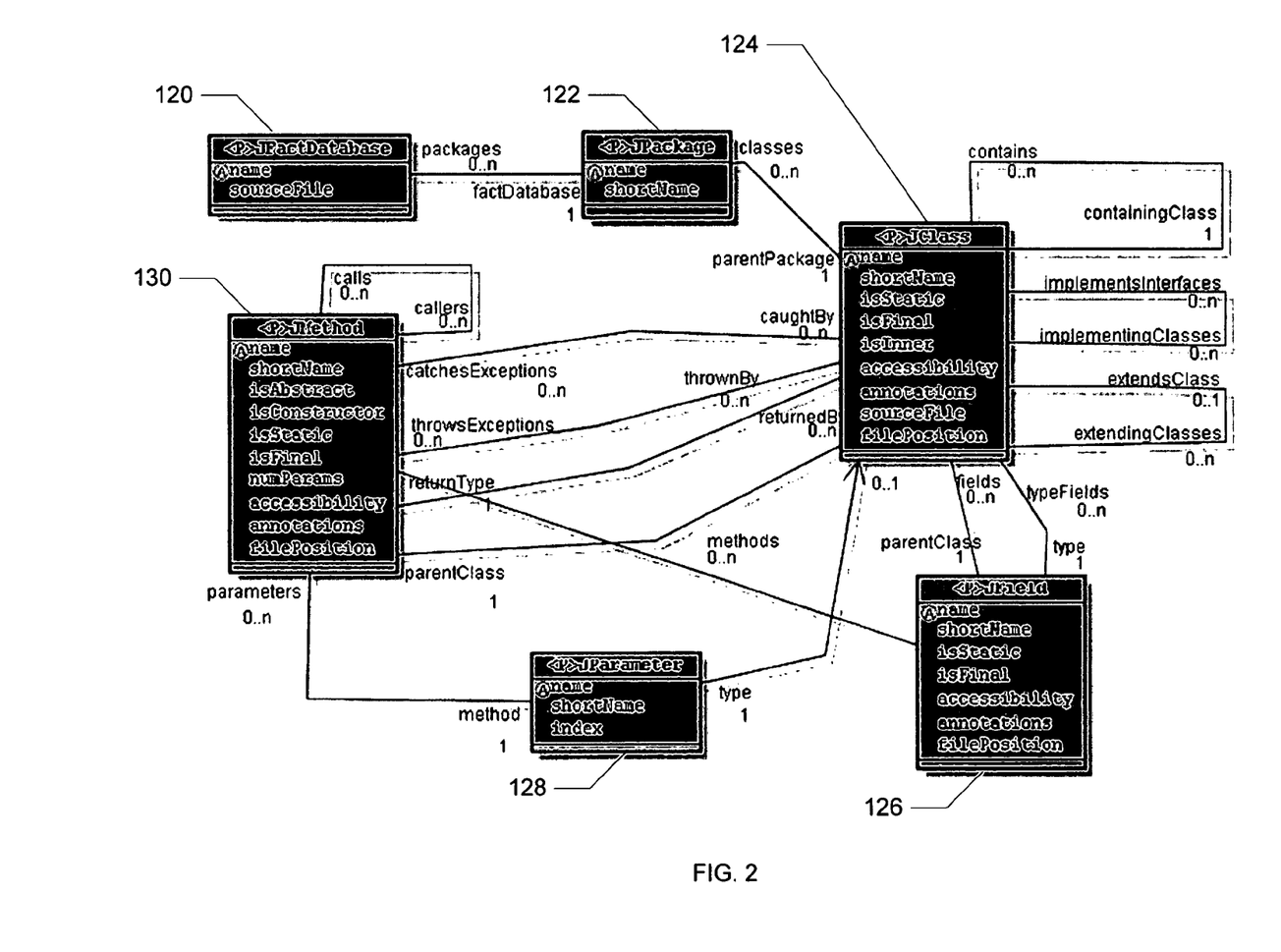
FIG. 2 shows a characteristics model in accordance one embodiment of the invention.

In one embodiment of the system, the characteristics model (108) describes artifacts (i.e., discrete components) in a particular domain. In one embodiment of the invention, the domain corresponds to any grouping of "related artifacts" (i.e., there is a relationship between the artifacts). Examples of domains include, but are not limited to, a Java™ 2 Enterprise Edition (J2EE) domain (which includes artifacts such as servlets, filters, welcome file, error page, etc.), a networking domain (which includes artifacts such as web server, domain name server, network interface cards, etc), and a DTrace domain, Java™ domain (described below). In one embodiment of the invention, each characteristics model includes one or more artifacts, one or more relationships describing the interaction between the various artifacts, and one or more characteristics that describe various features of the artifact. An example of a characteristics model (108) is shown in FIG. 2. Those skilled in the art will appreciate that the system may include more than one characteristics model (108).

In one embodiment of the invention, the use of characteristics model(s) (108) enables a user to analyze the target system (100) with respect to a specific domain. Further, the use of multiple characteristics models allows the user to analyze the target system (100) across multiple domains. In addition, the use of multiple characteristics models allows the user to analyze the interaction between various domains on the target system (100).

In one embodiment of the invention, the characteristics extractors (e.g., characteristics extractor A (102A), characteristics extractor N (102N)) are used to obtain information about various artifacts (i.e., characteristics) defined in the characteristics model (108). In one embodiment of the invention, the characteristics model (108) is used to generate the characteristics extractor (e.g., characteristics extractor A (102A), characteristics extractor N (102N)). In one embodiment of the invention, the characteristics extractors (characteristics extractor A (102A), characteristics extractor N (102N)) are generated manually using the characteristics model (108). Alternatively, the characteristics extractors (e.g., characteristics extractor A (102A), characteristics extractor N (102N)) are generated automatically using the characteristics model (108).

In one embodiment of the invention, the characteristics extractor (e.g., characteristics extractor A (102A), characteristics extractor N (102N)) corresponds to an agent loaded on the target system (100) that is configured to monitor and obtain information about the artifacts in the target system (100). Alternatively, the characteristics extractor (e.g., characteristics extractor A (102A), characteristics extractor N (102N)) may correspond to an interface that allows a user to manually input information about one or more artifacts. In another embodiment of the invention, the characteristics extractor (e.g., characteristics extractor A (102A), characteristics extractor N (102N)) may correspond to a process (or system) configured to obtain information about one or more artifacts in the target system (100) by monitoring network traffic received by and sent from the target system (100).

In another embodiment of the invention, the characteristics extractor (e.g., characteristics extractor A (102A), characteristics extractor N (102N)) may correspond to a process (or system) configured to obtain information about one or more artifacts in the target system (100) by sending requests (e.g., pinging, etc.) for specific pieces of information about artifacts in the target system (100) to the target system (100), or alternatively, sending requests to the target system and then extracting information about the artifacts from the responses received from target system (100).

In one embodiment of the invention, if the target system (100) corresponds to source code and the characteristics model (108) corresponds to a formal specification of a programming language (e.g., Java™), then the characteristics extractor (e.g., characteristics extractor A (102A), characteristics extractor N (102N)) may correspond to a process that is configured to parse the source code and temporarily store the artifacts and characteristics obtained from parsing the source code in an in-memory object graph.

Those skilled in the art will appreciate that different types of characteristics extractors may be used to obtain information about artifacts in the target system (100). Further, those skilled in the art will appreciate that each characteristics extractor (or set of characteristics extractors) is associated with a particular characteristics model. Thus, each characteristics extractor typically only retrieves information about artifacts described in the characteristics model with which the characteristics extractor is associated. Furthermore, if there are multiple characteristics models in the system, then each characteristics model may be associated with one or more characteristics extractors.

The information about the various artifacts in the target system (100) obtained by the aforementioned characteristics extractors (characteristics extractor A (102A), characteristics extractor N (102N)) is stored in the characteristics store (106) via the characteristic store API (104). In one embodiment of the invention, characteristics store API (104) provides an interface between the various characteristics extractors (characteristics extractor A (102A), characteristics extractor N (102N)) and the characteristics store (106). Further, the characteristics store API (104) includes information about where in the characteristics store (106) each characteristic obtained from the target system (100) should be stored.

In one embodiment of the invention, the characteristics store (106) corresponds to any storage that includes functionality to store characteristics in a manner that allows the characteristics to be queried. In one embodiment of the invention, the characteristics store (106) may correspond to a persistent storage device (e.g., hard disk, etc). In one embodiment of the invention, the characteristics store (106) corresponds to a relational database that may be queried using a query language such as Structure Query Language (SQL). Those skilled in the art will appreciate that any query language may be used. In one embodiment of the invention, if the characteristics store (106) is a relational database, then the characteristics model (108) may be used to generate a schema for storing the characteristics associated with the particular characteristics model (108). Those skilled in the art will appreciate that each characteristics model (108) within the system may be associated with a separate schema.

In one embodiment of the invention, the schema generated from the characteristics model (108) may include a table for each artifact where each table is configured to store all the characteristics for each instance of the artifact in the target system. Further, the relationships between the individual artifacts, as described in the characteristics model (108), may be implemented in the schema in the following manner: (i) for 1:1 relationships between artifacts, the primary key of one of the artifacts in the relationship is placed as a foreign key in the table corresponding to the other artifact in the relationship; (ii) for 1:n relationships between artifacts, the primary key for the artifact on the "1" side of the relationship is placed as a foreign key in the table corresponding to the artifact on the "n" side of the relationship; (iii) for m:n relationships between artifacts, a join table is created and the primary keys for each artifact in the relationship are placed in the join table as foreign keys. An example of a schema is included below. Those skilled in the art will appreciate that other schema implementations may be used in accordance with one or more embodiments of the invention.

In one embodiment of the invention, if the characteristics store (106) is a relational database that includes a schema generated from the characteristics model (108), then the characteristics store API (104) includes the necessary information to place characteristics obtained from target system (100) in the appropriate tables in the characteristics store (106). Specifically, the characteristics store API (104) may include information about which table in the characteristics store (106) to place specific pieces of information about artifacts in the target system (100). In one embodiment of the invention, the characteristics store API (104) is generated using the characteristics model (108).

In one embodiment of the invention, if the characteristics extractors are configured to temporarily store artifacts and characteristics obtained from the target system in an in-memory object graph, then the characteristics store API (104) is configured to populate the characteristics store (106) using the populated in-memory object graph. In one embodiment of the invention, characteristics store API (104) populates the characteristics store (106) by traversing the in-memory object graph and, for each artifact or characteristic encountered, determining where in the characteristics store (106) to store the artifact or characteristics, in accordance with the schema generated using the characteristics model with which the artifacts and characteristics are associated. In one embodiment of the invention, if the characteristics store (106) includes multiple schemas, then the characteristics store API (104) includes functionality to search the characteristics store (106) for the schema associated with the particular artifacts and/or characteristics. In one embodiment of the invention, all the characteristics store API (104) having aforementioned functionality and/or configuration is automatically generated using the characteristics model (108).

In one embodiment of the invention, the characteristics store API (104) is automatically generated from the characteristics model (108) in the following manner: (i) the desired functionality of the characteristics store API (104) (e.g., the functionality described in the preceding paragraphs) is formally specified; (ii) a characteristics model (108) that formally specifies artifacts and characteristics upon which the characteristics store API (104) is going to operate on (i.e., perform actions upon) is obtained; and (iii) both of the aforementioned formal specifications are input into a code generator to generate the resulting characteristics store API (104). Those skilled in the art will appreciate that additional information such as execution environment (e.g., operating system, hardware platform, configuration of the characteristics store (106), etc.) may also need to be specified prior to generating the characteristics store API (104).

In one embodiment of the invention, the aforementioned characteristics store API (104) generated in accordance with aforementioned embodiment corresponds to one or more data access objects (DAO). In one embodiment of the invention, each DAO corresponds to an object that provides an abstraction layer between the characteristics extractors and the characteristics store (106). In particular, DAOs may be created by and then receive characteristics from the characteristics extractors. Once the DAOs have received the characteristics from the characteristics extractors, the DAOs proceed to store the characteristics in the characteristics store (106). Those skilled in the art will appreciate that the DAOs include the necessary functionality to store the characteristics in the correct table in the characteristics store (106).

In one embodiment of the invention, characteristics extractors and the characteristics store API (104) are automatically generated from the characteristics model (108) as described above with respect to the characteristics store API (104). In this embodiment of the invention, the characteristics model (108) is used to automatically generate a web-application having a front-end that corresponds to a characteristics extractor and a back-end that corresponds to a characteristics store API (104).

In particular, the front-end of the web-application corresponds to one or more web pages that enable a user to perform one or more of the following actions: add an entry, modify an entry, view an entry, search for an entry (or multiple entries), and delete an entry, where the entry corresponds to an artifact or characteristics within (or to be stored in) the characteristics store (106). In one embodiment of the invention, the back-end of the web-application corresponds to one or more DAOs (as described above) configured to perform the action requested by the user (i.e., the action request via the front-end of the web-application).

Continuing with the discussion of FIG. 1, in one embodiment of the invention, the query engine (110) is configured to issue queries to the characteristics store (106). In one embodiment of the invention, the queries issued by the query engine (110) enable a user (e.g., a system developer, etc.) to analyze the target system (100). In particular, in one embodiment of the invention, the query engine (10) is configured to enable the user to analyze the presence of specific patterns in the target system as well as the interaction between various patterns in the target system.

In one embodiment of the invention, a pattern corresponds to a framework that defines how specific components in the target system should be configured (e.g., what types of information each component should manage, what interfaces should each component expose), and how the specific components should communicate with each other (e.g., what data should be communicated to other components, etc.). Patterns are typically used to address a specific problem in a specific context (i.e., the software/system environment in which the problem arises). Said another way, patterns may correspond to a software architectural solution that incorporates best practices to solve a specific problem in a specific context.

Continuing with the discussion of FIG. 1, the query engine (110) may also be configured to issue queries about interaction of specific patterns with components that do not belong to a specific pattern. Further, the query engine (110) may be configured to issue queries about the interaction of components that do not belong to any patterns.

In one embodiment of the invention, the query engine (110) may include pre-specified queries and/or enable to the user to specify custom queries. In one embodiment of the invention, both the pre-specified queries and the custom queries are used to identify the presence of one or more patterns and/or the presence of components that do not belong to a pattern in the target system (100). In one embodiment of the invention, the pre-specified queries and the custom queries are specified using a Pattern Query Language (PQL). In one embodiment of the invention, PQL enables the user to query the artifacts and characteristics of the artifacts stored in the characteristics store (106) to determine the presence of a specific pattern, specific components of a specific pattern, and/or other components that are not part of a pattern, within the target system (100).

In one embodiment of the invention, the query engine (110) may include information (or have access to information) about the characteristics model (108) that includes the artifact and/or characteristics being queried. Said another way, if the query engine (110) is issuing a query about a specific artifact, then the query engine (110) includes information (or has access to information) about the characteristics model to which the artifact belongs. Those skilled in the art will appreciate that the query engine (110) only requires information about the particular characteristics model (108) to the extent the information is required to issue the query to the characteristics store (106).

Those skilled in the art will appreciate that the query engine (110) may include functionality to translate PQL queries (i.e., queries written in PQL) into queries written in a query language understood by the characteristics store (106) (e.g., SQL). Thus, a query written in PQL may be translated into an SQL query prior to being issued to the characteristics store (106). In this manner, the user only needs to understand the artifacts and/or characteristics that the user wishes to search for and how to express the particular search using PQL. The user does not need to be concerned with how the PQL query is handled by the characteristics store (106).

Further, in one or more embodiments of the invention, PQL queries may be embedded in a programming language such as Java™, Groovy, or any other programming language capable of embedding PQL queries. Thus, a user may embed one or more PQL queries into a program written in one of the aforementioned programming languages. Upon execution, the program issues one or more PQL queries embedded within the program and subsequently receives and processes the results prior to displaying them to the user. Those skilled in the art will appreciate that the processing of the results is performed using functionality of the programming language in which the PQL queries are embedded.

In one embodiment of the invention, the results of the individual PQL queries may be displayed using the interface (112). In one embodiment of the invention, the interface (112) is configured to output the results of the queries on a display device (i.e., monitor, printer, projector, etc.).

As discussed above, each characteristics model defines one or more artifacts, one or more relationships between the artifacts, and one or more characteristics for each artifact. In one embodiment of the invention, the characteristics model corresponds to a formal specification of a domain. The following is an example of a Java™ characteristics model that is formal specification of a Java™ language domain in accordance with one embodiment of the invention.

Java ™ Characteristics Model

```
1  persistent class JFactDatabase {
2    long id primary key;
3    String version;
4    String name;
5    String sourceFile;
6    references JPackage packages(0,n) inverse factDatabase(1,1);
7  } // class JFactDatabase
8
9  persistent class JPackage {
10   long id primary key;
11   String version;
12   String name;
13   String shortName;
14   references JPackage packages (0,n) inverse parentPackage(1,1);
15   references JClass classes (0,n) inverse parentPackage(1,1);
16 } // class JPackage
17
```

| Java ™ Characteristics Model |
| --- |
| 18 persistent class JClass { |
| 19    long id primary key; |
| 20    String version; |
| 21    String name; |
| 22    String shortName; |
| 23    Boolean isStatic; |
| 24    Boolean isFinal; |
| 25    Boolean isInner; |
| 26    String accessibility; |
| 27    String sourceFile; |
| 28    Integer filePosition; |
| 29    references JClass implementsInterfaces(0,n) inverse implementingClasses(0,n); |
| 30    references JClass extendsClass(0,1) inverse extendingClasses(0,n); |
| 31    references JClass contains(0,n) inverse containingClass(1,1); |
| 32    references JMethod methods(0,n) inverse parentClass(1,1); |
| 33    references JField fields(0,n) inverse parentClass(1,1); |
| 34    references JAnnotation annotations(0,n) inverse parentClass(1,1); |
| 35 } // class JClass |
| 36 |
| 37 persistent class JMethod { |
| 38    long id primary key; |
| 39    String version; |
| 40    String name; |
| 41    String shortName; |
| 42    Boolean isAbstract; |
| 43    Boolean isConstructor; |
| 44    Boolean isStatic; |
| 45    Boolean isFinal; |
| 46    Integer numParams; |
| 47    String accessibility; |
| 48    Integer filePosition; |
| 49    references JClass returnType(1,1) inverse returnedBy(0,n); |
| 50    references JClass throwsExceptions(0,n) inverse thrownBy(0,n); |
| 51    references JClass catchesExceptions(0,n) inverse caughtBy(0,n); |
| 52    references JClass instantiates(0,n) inverse instantiatedBy(0,n); |
| 53    references JMethod calls(0,n) inverse callers(0,n); |
| 54    references JParameter parameters(0,n) inverse method(1,1); |
| 55    references JField usedFields(0,n) inverse usedByMethods(0,n); |
| 56    references JAnnotation annotations(0,n) inverse parentMethod(1,1); |
| 57 } // class JMethod |
| 58 |
| 59 persistent class JField { |
| 60    long id primary key; |
| 61    String version; |
| 62    String name; |
| 63    String shortName; |
| 64    Boolean isStatic; |
| 65    Boolean isFinal; |
| 66    String accessibility; |
| 67    Integer filePosition; |
| 68    references JClass type(1,1) inverse typeFields(0,n); |
| 69    references JAnnotation annotations(0,n) inverse parentField(1,1); |
| 70 } //class JField |
| 71 |
| 72 persistent class JParameter { |
| 73    long id primary key; |
| 74    String version; |
| 75    String name; |
| 76    String shortName; |
| 77    Integer index; |
| 78    references JClass type(1,1) inverse typeParameters(0,n); |
| 79    references JAnnotation annotations(0,n) inverse parentParameter(1,1); |
| 80 } // class JParameter |
| 81 |

In the above Java™ characteristics model, the JFactDatabase artifact is defined in lines 1-7, the JPackage artifact is defined in lines 9-16, the JClass artifact is defined in lines 18-35, the JMethod artifact is defined in lines 37-57, the JField artifact is defined in lines 59-70, and the JParameter artifact is defined in lines 72-80. A graphical representation of the Java™ characteristics model described above is shown in FIG. 2. Specifically, FIG. 2 shows each of the aforementioned Java™ characteristics model attributes (i.e., JFactDatabase, JPackage, JClass, JField, JParameter, and JMethod) as well as the characteristics associated with each of the aforementioned artifacts and the relationships between the aforementioned artifacts. In particular, box (120) corresponds to the JFactDatabase artifact, box (122) corresponds to the JPackage artifact, box (124) corresponds to the JClass artifact, box (126) corresponds to the JField artifact, box (128) corresponds to the JParameter artifact, and box (130) corresponds to the JMethod artifact.

As discussed above, the characteristics model is used to automatically generate a schema. The following text describes a textual representation of a Java™ schema generated using the Java™ characteristics model shown in FIG. 2.

| Java ™ Schema |
| --- |
| 1 CREATE TABLE JFactDatabase( |
| 2    id INTEGER, |
| 3    version VARCHAR(255), |
| 4    name VARCHAR(255), |
| 5    sourceFile VARCHAR(255), |
| 6    PRIMARY KEY( id ) |
| 7 ); |
| 8 |
| 9 CREATE UNIQUE INDEX JFactDatabase__PRIMARY__KEY ON JFactDatabase(id); |
| 10 CREATE UNIQUE INDEX JFactDatabase__name ON JFactDatabase(name); |
| 11 COMMIT; |
| 12 |
| 13 CREATE TABLE JPackage( |
| 14    id INTEGER, |
| 15    version VARCHAR(255), |
| 16    name VARCHAR(255), |
| 17    shortName VARCHAR(255), |
| 18    factDatabase INTEGER, |
| 19    PRIMARY KEY ( id ) |
| 20 ); |
| 21 |
| 22 CREATE UNIQUE INDEX JPackage__PRIMARY__KEY ON JPackage(id); |

-continued

Java ™ Schema

```
23  CREATE UNIQUE INDEX JPackage__name ON JPackage(name);
24  COMMIT;
25
26  CREATE TABLE JClass(
27      id INTEGER,
28      version VARCHAR(255),
29      name VARCHAR(255),
30      shortName VARCHAR(255),
31      isStatic BOOLEAN,
32      isFinal BOOLEAN,
33      isInner BOOLEAN,
34      accessibility VARCHAR(255),
35      sourceFile VARCHAR(255),
36      filePosition INTEGER,
37      parentPackage INTEGER,
38      extendsClass INTEGER,
39      containingClass INTEGER,
40      PRIMARY KEY ( id )
41  );
42
43  CREATE UNIQUE INDEX JClass__PRIMARY__KEY ON JClass(id);
44  CREATE UNIQUE INDEX JClass__name ON JClass(name);
45  COMMIT;
46
47  CREATE TABLE JClass__ImplementsInterfaces(    -- JOIN table for m:n relationship
48      implementsInterfaces INTEGER,
49      implementingClasses INTEGER,
50      PRIMARY KEY ( implementsInterfaces,implementingClasses ),
51      KEY(implementsInterfaces), KEY(implementingClasses)
52  );
53
54  CREATE TABLE JClass__ImplementsInterfacesTransitive(    -- JOIN table for m:n relationship
55      implementsInterfaces INTEGER,
56      implementingClasses INTEGER,
57      PRIMARY KEY ( implementsInterfaces,implementingClasses ),
58      KEY(implementsInterfaces), KEY(implementingClasses)
59  );
60
61  COMMIT;
62
63  CREATE TABLE JClass__ExtendsClasses(    -- JOIN table for m:n relationship
64      extendsClasses INTEGER,
65      extendingClasses INTEGER,
66      PRIMARY KEY ( extendsClasses,extendingClasses ),
67      KEY(extendsClasses), KEY(extendingClasses)
68  );
69
70  CREATE TABLE JClass__ExtendsClassesTransitive(    -- JOIN table for m:n relationship
71      extendsClasses INTEGER,
72      extendingClasses INTEGER,
73      PRIMARY KEY ( extendsClasses,extendingClasses ),
74      KEY(extendsClasses), KEY(extendingClasses)
75  );
76  COMMIT;
77
78  CREATE TABLE JMethod__Calls(
79      calls INTEGER,
80      callers INTEGER,
81      filePosition INTEGER,
82      PRIMARY KEY (calls,callers),
83      KEY(calls), KEY(callers)
84  );
85  CREATE TABLE JMethod__CallsTransitive(
86      calls INTEGER,
87      callers INTEGER,
88      filePosition INTEGER,
89      PRIMARY KEY (calls,callers),
90      KEY(calls), KEY(callers)
91  );
92  COMMIT;
93
94  CREATE TABLE JMethod__ThrowsExceptions(
95      throwsExceptions INTEGER,
96      thrownBy INTEGER,
97      filePosition INTEGER,
98      PRIMARY KEY ( throwsExceptions,thrownBy ),
99      KEY(throwsExceptions), KEY(thrownBy)
```

-continued

| Java ™ Schema |
|---|

```
100      );
101   COMMIT;
102
103   CREATE TABLE JMethod__CatchesExceptions(
104       catchesExceptions INTEGER,
105       caughtBy INTEGER,
106       filePosition INTEGER,
107       PRIMARY KEY ( catchesExceptions,caughtBy ),
108       KEY(catchesExceptions), KEY(caughtBy)
109      );
110   COMMIT;
111   CREATE TABLE JMethod__Instantiates(
112       callingMethod INTEGER,
113       instantiatedClass INTEGER,
114       filePosition INTEGER,
115       PRIMARY KEY ( callingMethod,instantiatedClass ),
116       KEY(callingMethod), KEY(instantiatedClass)
117      );
118
119   CREATE TABLE JMethod__InstantiatesTransitive(
120       callingMethod   INTEGER,
121       instantiatedClass INTEGER,
122       filePosition INTEGER,
123       PRIMARY KEY ( callingMethod,instantiatedClass ),
124       KEY(callingMethod), KEY(instantiatedClass)
125      );
126   COMMIT;
127
128   CREATE TABLE JMethod(
129       id INTEGER,
130       version VARCHAR(255),
131       name VARCHAR(255),
132       shortName VARCHAR(255),
133       isAbstract BOOLEAN,
134       isConstructor BOOLEAN,
135       isStatic BOOLEAN,
136       isFinal BOOLEAN,
137       numParams INTEGER,
138       accessibility VARCHAR(255),
139       filePosition INTEGER,
140       parentClass INTEGER,
141       returnType INTEGER,
142       PRIMARY KEY ( id )
143      );
144
145   CREATE UNIQUE INDEX JMethod__PRIMARY__KEY ON JMethod(id);
146   CREATE UNIQUE INDEX JMethod__name ON JMethod(name);
147   COMMIT;
148
149   CREATE TABLE JMethod__UsedFields(
150       usedFields INTEGER,
151       usedByMethods INTEGER,
152       filePosition INTEGER,
153       PRIMARY KEY ( usedFields,usedByMethods ),
154       KEY(usedFields), KEY(usedByMethods)
155      );
156   COMMIT;
157
158   CREATE TABLE JField(
159       id INTEGER,
160       version VARCHAR(255),
161       name VARCHAR(255),
162       shortName VARCHAR(255),
163       isStatic BOOLEAN,
164       isFinal BOOLEAN,
165       accessibility VARCHAR(255),
166       filePosition INTEGER,
167       parentClass INTEGER,
168       type INTEGER,
169       PRIMARY KEY ( id )
170      );
171
172   CREATE UNIQUE INDEX JField__PRIMARY__KEY ON JField(id);
173   CREATE UNIQUE INDEX JField__name ON JField(name);
174   COMMIT;
175
176   CREATE TABLE JParameter(
```

-continued

| Java ™ Schema |
|---|

```
177     id INTEGER PRIMARY KEY,
178     version VARCHAR(255),
179     name VARCHAR(255),
180     shortName VARCHAR(255),
181     parameterIndex INTEGER,
182     method INTEGER,
183     type INTEGER
184   );
185
186 CREATE UNIQUE INDEX JParameter__PRIMARY__KEY ON JParameter(id);
187 CREATE UNIQUE INDEX JParameter__name ON JParameter(name);
188 COMMIT;
189
190 CREATE TABLE JAnnotation(
191     id INTEGER PRIMARY KEY,
192     version VARCHAR(255),
193     name VARCHAR(255),
194     shortName VARCHAR(255),
195     numArgs INTEGER,
196     parentClass INTEGER,
197     parentMethod INTEGER,
198     parentField INTEGER,
199     parentParameter INTEGER,
200     type INTEGER
201   );
202
203 CREATE UNIQUE INDEX JAnnotation__PRIMARY__KEY ON JAnnotation(id);
204 CREATE UNIQUE INDEX JAnnotation__name ON JAnnotation(name);
205 COMMIT;
206
207 CREATE TABLE JAnnotationArgument(
208     id INTEGER PRIMARY KEY,
209     version VARCHAR(255),
210     name VARCHAR(255),
211     shortName VARCHAR(255),
212     stringValue VARCHAR(10000),
213     annotation INTEGER,
214     type INTEGER
215   );
216
217 CREATE UNIQUE INDEX JAnnotationArgument__PRIMARY__KEY ON
218 JAnnotationArgument(id);
219 CREATE UNIQUE INDEX JAnnotationArgument__name ON JAnnotationArgument(name);
220 COMMIT;
221
222 CREATE TABLE WriteVariable(
223
224     cookie VARCHAR(255),
225     scope INTEGER,
226     name VARCHAR(255),
227     varIndex INTEGER,
228     nodeId DECIMAL(20,0),
229     nodeName VARCHAR(255)
230   );
231
232 COMMIT;
233
234 CREATE TABLE ReadVariable(
235
236     cookie VARCHAR(255),
237     scope INTEGER,
238     name VARCHAR(255),
239     varIndex INTEGER,
240     nodeId DECIMAL(20,0),
241     nodeName VARCHAR(255)
242   );
243
244 CREATE UNIQUE INDEX ReadVariable__PRIMARY__KEY ON
245 ReadVariable(cookie,scope,name,varIndex);
246 COMMIT;
247
248 ALTER TABLE JPackage ADD CONSTRAINT JPackage__factDatabase FOREIGN KEY
249     (factDatabase) REFERENCES JFactDatabase(id);
250 ALTER TABLE JClass ADD CONSTRAINT JClass__parentPackage FOREIGN KEY
251     (parentPackage) REFERENCES JPackage(id);
252 ALTER TABLE JClass ADD CONSTRAINT JClass__extendsClass FOREIGN KEY
253     (extendsClass) REFERENCES JClass(id);
```

-continued

Java™ Schema

```
254  ALTER TABLE JClass ADD CONSTRAINT JClass_containingClass FOREIGN KEY
255      (containingClass) REFERENCES JClass(id);
256  ALTER TABLE JClass_ImplementsInterfaces ADD CONSTRAINT
257      JClass_ImplementsInterfaces_fk_for_implementsInterfaces FOREIGN KEY
258      (implementsInterfaces) REFERENCES JClass(id);
259  ALTER TABLE JClass_ImplementsInterfaces ADD CONSTRAINT
260      JClass_ImplementsInterfaces_fk_for_implementingClasses FOREIGN KEY
261      (implementingClasses) REFERENCES JClass(id);
262  ALTER TABLE JClass_ExtendsClasses ADD CONSTRAINT
263      JClass_ExtendsClasses_fk_for_extendsClasses FOREIGN KEY (extendsClasses)
264      REFERENCES JClass(id);
265  ALTER TABLE JClass_ExtendsClasses ADD CONSTRAINT
266      JClass_ExtendsClasses_fk_for_extendingClasses FOREIGN KEY (extendingClasses)
267      REFERENCES JClass(id);
268  ALTER TABLE JMethod_ThrowsExceptions ADD CONSTRAINT
269      JMethod_ThrowsExceptions_fk_for_throwsExceptions FOREIGN KEY
270      (throwsExceptions) REFERENCES JMethod(id);
271  ALTER TABLE JMethod_ThrowsExceptions ADD CONSTRAINT
272      JMethod_ThrowsExceptions_fk_for_thrownBy FOREIGN KEY (thrownBy)
273      REFERENCES JClass(id);
274  ALTER TABLE JMethod_CatchesExceptions ADD CONSTRAINT
275      JMethod_CatchesExceptions_fk_for_catchesExceptions FOREIGN KEY
276      (catchesExceptions) REFERENCES JMethod(id);
277  ALTER TABLE JMethod_CatchesExceptions ADD CONSTRAINT
278      JMethod_CatchesExceptions_fk_for_caughtBy FOREIGN KEY (caughtBy)
279      REFERENCES JClass(id);
280  ALTER TABLE JMethod ADD CONSTRAINT JMethod_parentClass FOREIGN KEY
281      (parentClass) REFERENCES JClass(id);
282  ALTER TABLE JMethod ADD CONSTRAINT JMethod_returnType FOREIGN KEY
283      (returnType) REFERENCES JClass(id);
284  ALTER TABLE JMethod_Calls ADD CONSTRAINT JMethod_Calls_fk_for_calls FOREIGN
285      KEY (calls) REFERENCES JMethod(id);
286  ALTER TABLE JMethod_Calls ADD CONSTRAINT JMethod_Calls_fk_for_callers FOREIGN
287      KEY (callers) REFERENCES JMethod(id);
288  ALTER TABLE JMethod_UsedFields ADD CONSTRAINT
289      JMethod_UsedFields_fk_for_usedFields FOREIGN KEY (usedFields) REFERENCES
290      JMethod(id);
291  ALTER TABLE JMethod_UsedFields ADD CONSTRAINT
292      JMethod_UsedFields_fk_for_usedByMethods FOREIGN KEY (usedByMethods)
293      REFERENCES JField(id);
294  ALTER TABLE JField ADD CONSTRAINT JField_parentClass FOREIGN KEY (parentClass)
295      REFERENCES JClass(id);
296  ALTER TABLE JField ADD CONSTRAINT JField_type FOREIGN KEY (type)
297      REFERENCES JClass(id);
298  ALTER TABLE JParameter ADD CONSTRAINT JParameter_method FOREIGN KEY
299      (method) REFERENCES JMethod(id);
300  ALTER TABLE JParameter ADD CONSTRAINT JParameter_type FOREIGN KEY (type)
301      REFERENCES JClass(id);
302  ALTER TABLE JAnnotation ADD CONSTRAINT JAnnotation_parentClass FOREIGN KEY
303      (parentClass) REFERENCES JClass(id);
304  ALTER TABLE JAnnotation ADD CONSTRAINT JAnnotation_parentMethod FOREIGN KEY
305      (parentMethod) REFERENCES JMethod(id);
306  ALTER TABLE JAnnotation ADD CONSTRAINT JAnnotation_parentField FOREIGN KEY
307      (parentField) REFERENCES JField(id);
308  ALTER TABLE JAnnotation ADD CONSTRAINT JAnnotation_parentParameter FOREIGN
309      KEY (parentParameter) REFERENCES JParameter(id);
310  ALTER TABLE JAnnotation ADD CONSTRAINT JAnnotation_type FOREIGN KEY (type)
311      REFERENCES JClass(id);
312  ALTER TABLE JAnnotationArgument ADD CONSTRAINT JAnnotationArgument_annotation
313      FOREIGN KEY (annotation) REFERENCES JAnnotation(id);
314  ALTER TABLE JAnnotationArgument ADD CONSTRAINT JAnnotationArgument_type
315      FOREIGN KEY (type) REFERENCES JClass(id);
```

The following describes the various portions of the Java™ Schema: (i) lines 1-11 define the table associated with the JFactDatabase artifact; (ii) lines 13-24 define the table associated with the JPackage artifact; (iii) lines 26-45 define the table associated with the JClass artifact; (iv) lines 47-76 define various join tables used to represent various m:n relationships defined in the Java™ characteristics model shown in FIG. 2 for the JClass artifact; (v) lines 128-147 define the table associated with the JMethod artifact; (vi) lines 78-126 and 149-157 define various tables used to represent various relationships defined in the Java™ characteristics mode shown in FIG. 2 for the JMethod artifact; (vii) lines 158-174 define the table associated with the JField artifact; (viii) lines 176-188 define the table associated with the JParameter artifact; (ix) lines 190-247 define additional tables used to implement the Java™ schema; (x) lines 248-315 define the various relationships (e.g., 1:1 and 1:n) between the various artifacts defined in the Java™ characteristics model.

Figure 3:
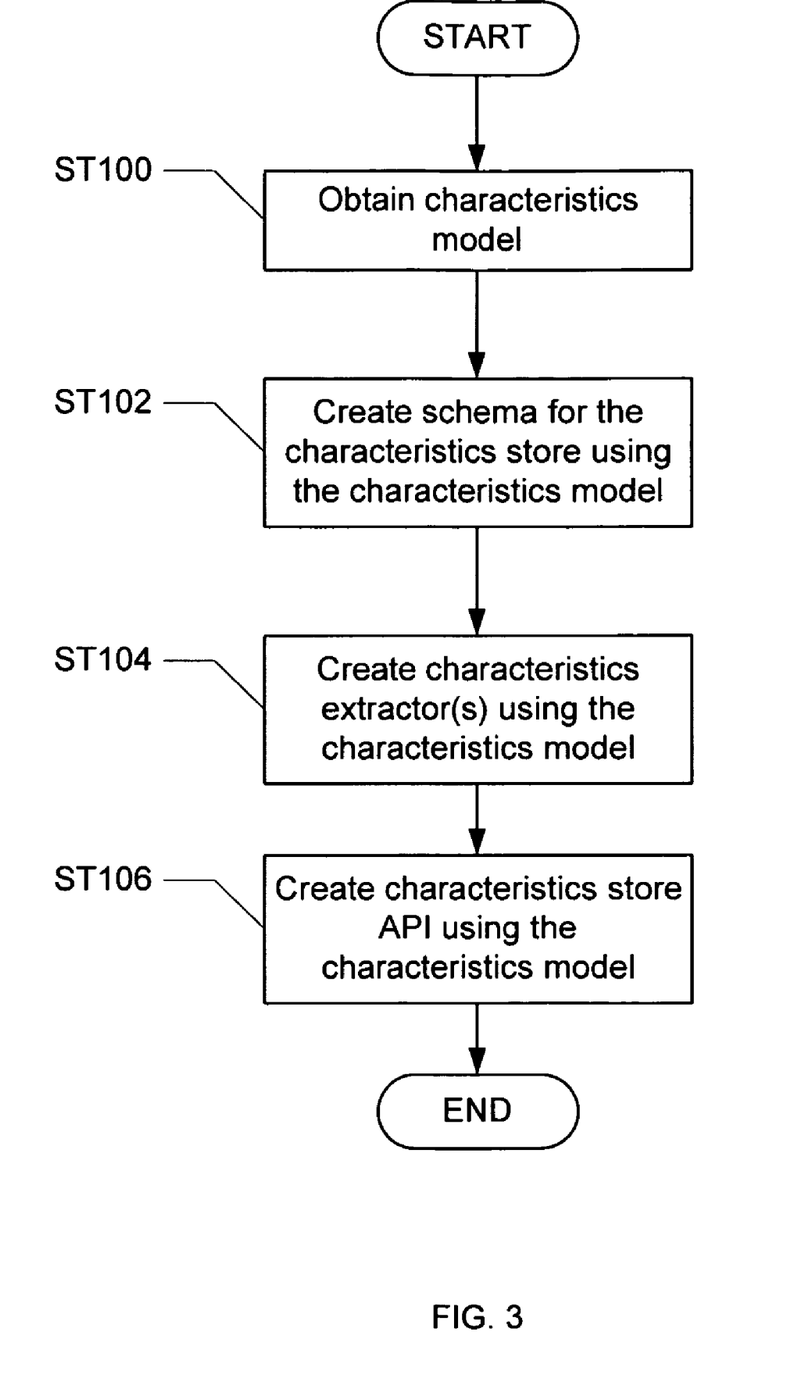
FIGS. 3 and 4 show flowcharts in accordance with one embodiment of the invention.

FIG. 3 shows a flowchart in accordance with one embodiment of the invention. Initially, a characteristics model is obtained (ST100). In one embodiment of the invention, the characteristics model is obtained from a pre-defined set of characteristics models. Alternatively, the characteristics model is customized characteristics model to analyze a specific domain in the target system and obtained from a source specified by the user.

Continuing with the discussion of FIG. 3, a schema for the characteristics store is subsequently created and associated with characteristics model (ST102). One or more characteristics extractors associated with characteristics model are subsequently created (ST104). Finally, a characteristics store API is created (ST106). In one embodiment of the invention, creating the characteristics store API includes creating a mapping between characteristics obtained by the characteristics extractors and tables defined by the schema configured to store the characteristics in the characteristics store.

Those skilled in the art will appreciate that ST100-ST106 may be repeated for each characteristics model. In addition, those skilled in the art will appreciate that once a characteristics store API is created, the characteristics store API may only need to be modified to support additional schemas in the characteristics data store and additional characteristics extractors. Alternatively, each characteristics model may be associated with a different characteristics store API.

Figure 4:
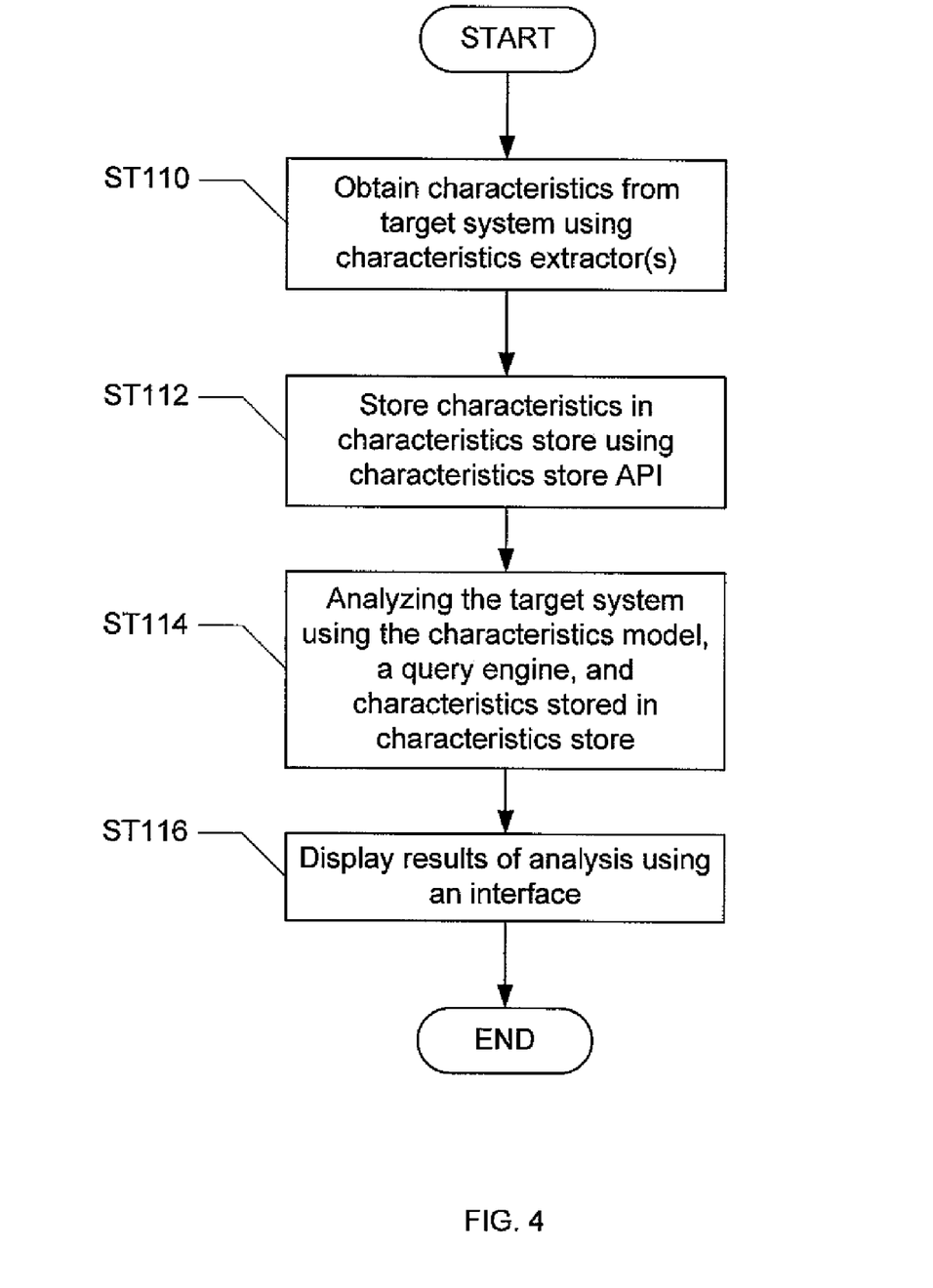

At this stage, the system is ready to analyze a target system. FIG. 4 shows a flowchart in accordance with one embodiment of the invention. Initially, characteristics are obtained from the target system using one or more characteristics extractors (ST110). In one embodiment of the invention, the characteristics extractors associated with a given characteristics model only obtain information about characteristics associated with the artifacts defined in the characteristics model.

Continuing with the discussion of FIG. 4, the characteristics obtained from the target system using the characteristics extractors are stored in the characteristics store using the characteristics store API (ST112). Once the characteristics are stored in the characteristics store, the target system may be analyzed using the characteristics model (or models), a query engine, and the characteristics stored in the characteristics store (ST114). In one embodiment of the invention, the user uses the query engine to issue queries to characteristics store. As discussed above, the query engine may include information (or have access to information) about the characteristics models currently being used to analyze the target system. The results of the analysis are subsequently displayed using an interface (ST116).

Those skilled in the art will appreciate that ST110-ST112 may be performed concurrently with ST114-ST116. In addition, steps in FIG. 3, may be performed concurrently with the steps in FIG. 4.

Figure 5:
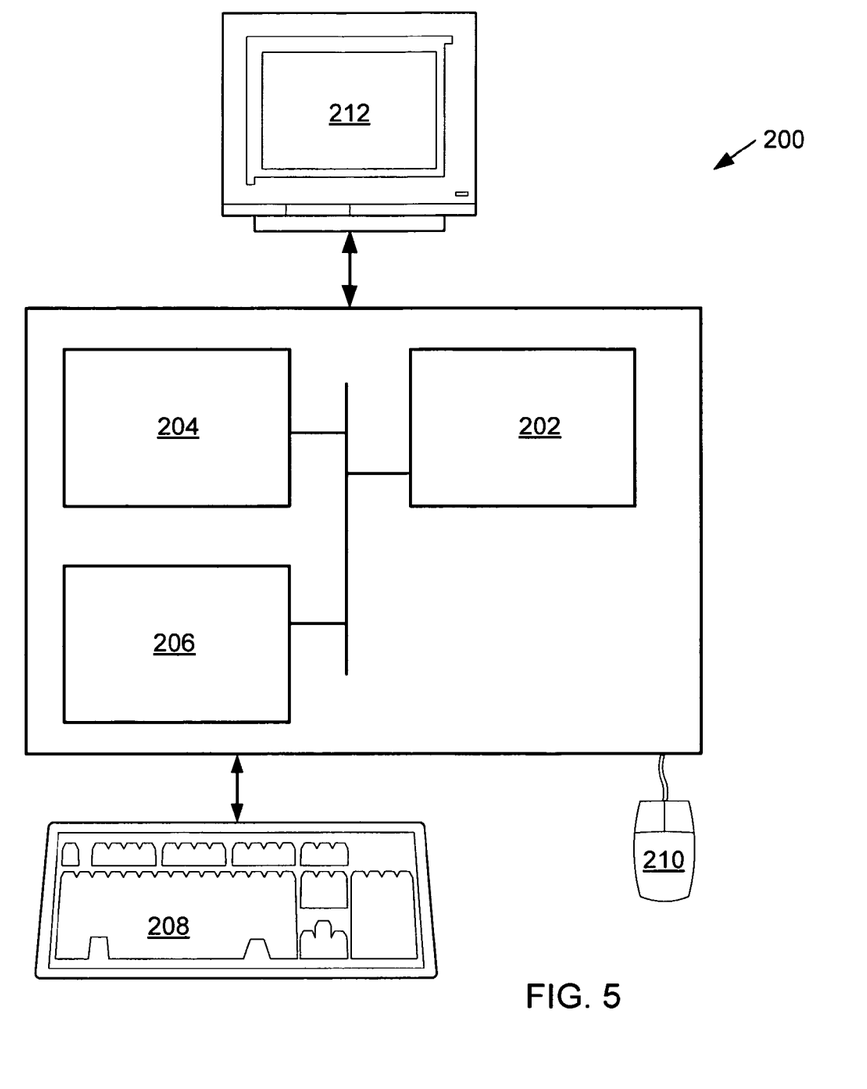
FIG. 5 shows a computer system in accordance with one embodiment of the invention.

An embodiment of the invention may be implemented on virtually any type of computer regardless of the platform being used. For example, as shown in FIG. 5, a networked computer system (200) includes a processor (202), associated memory (204), a storage device (206), and numerous other elements and functionalities typical of today's computers (not shown). The networked computer (200) may also include input means, such as a keyboard (208) and a mouse (210), and output means, such as a monitor (212). The networked computer system (200) is connected to a local area network (LAN) or a wide area network via a network interface connection (not shown). Those skilled in the art will appreciate that these input and output means may take other forms. Further, those skilled in the art will appreciate that one or more elements of the aforementioned computer (200) may be located at a remote location and connected to the other elements over a network. Further, software instructions to perform embodiments of the invention may be stored on a computer readable storage medium such as a compact disc (CD), or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing a target system with respect to domains, comprising:
    obtaining a characteristics model describing a first domain, wherein the first domain comprises a first hardware component, a first software component, and a relationship describing an interaction between the first hardware component and the first software component;
    obtaining a plurality of characteristics from the target system using a characteristics extractor, wherein each of the plurality of characteristics is associated with the characteristics model;
    storing each of the plurality of characteristics in a characteristics store using a schema,
        wherein the characteristics extractor uses a characteristics store Application Programming Interface (API) to store each of the plurality of characteristics in the characteristics store, and
        wherein the characteristics extractor is a front-end of a web-application comprising functionality to enable a user to request at least one action selected from a group consisting of adding, modifying, viewing, searching, and deleting an entry from the characteristics store;
    analyzing the target system with respect to the first domain and a second domain by issuing at least one query to the characteristics store to obtain an analysis result,
        wherein the target system is a computer comprising a processor and memory,
        wherein the target system simultaneously executes the first domain and the second domain,
        wherein the second domain comprises a second hardware component and a second software component, and a relationship between the second hardware component and the second software component, and
        wherein the analysis result identifies at least one relationship between the first domain and the second domain, wherein the at least one relationship defines an interaction between the first domain and the second domain during the simultaneous execution of the first domain and the second domain; and
    outputting the analysis result to a physical output device.

2. The method of claim 1, wherein the characteristics store API is a back-end of the web-application.

3. The method of claim 1, wherein the characteristics store API comprises a data access object.

4. The method of claim 1, wherein the characteristics model defines at least one characteristic of at least one selected from a group consisting of the first hardware component and the first software component.

5. The method of claim 1, wherein the at least one query is defined using a pattern query language.

6. The method of claim 5, wherein the pattern query language includes functionality to search for at least one pattern in the target system.

7. A system, comprising:
a characteristics model describing a first domain, wherein the first domain comprises a first hardware component, a first software component, a relationship describing an interaction between the first hardware component and the first software component;
a target system comprising a plurality of characteristics, wherein the target system is a computer comprising a processor and memory,
wherein the target system simultaneously executes the first domain and a second domain, and
wherein the second domain comprises a second hardware component, a second software component, and a relationship between the second hardware component and the second software component;
at least one characteristics extractor configured to obtain at least one of the plurality of characteristics from the target system;
a characteristics store, located on a computer readable storage medium, configured to store the at least one of the plurality of characteristics obtained from the target system using a schema and a characteristics store Application Programming Interface (API),
wherein the at least one characteristics extractor is generated using the characteristics model and configured to use the characteristics store API to store at least one of the plurality of characteristics obtained from the target system in the characteristics store, and
wherein the at least one characteristics extractor is a front-end of a web-application comprising functionality to enable a user to request at least one action selected from a group consisting of adding, modifying, viewing, searching, and deleting an entry from the characteristics store; and
a query engine configured to:
analyze the target system with respect to the first domain and the second domain by issuing at least one query to the characteristics store and configured to obtain an analysis result in response to the at least one query,
wherein the analysis result identifies at least one relationship between the first domain and the second domain, wherein the at least one relationship defines an interaction between the first domain and the second domain during the simultaneous execution of the first domain and the second domain.

8. The system of claim 7, wherein the characteristics store API is a back-end of the web-application.

9. The system of claim 7, wherein the at least one characteristics extractor is automatically generated using the characteristics model.

10. The system of claim 7, wherein the characteristics model defines at least one characteristic of at least one selected from a group consisting of the first hardware component and the first software component.

11. The system of claim 7, wherein the at least one query is defined using a pattern query language and wherein the pattern query language includes functionality to search for at least one pattern in the target system.

12. The system of claim 7, wherein the characteristics store API comprises at least one data access object.

13. A computer readable storage medium comprising software instructions executable by a processor, the software instructions for causing the processor to:
obtain a characteristics model comprising describing a first domain, wherein the first domain specifies a first hardware component, a first software component, and a relationship describing an interaction between the first hardware component and the first software component;
obtain a plurality of characteristics from the target system using a characteristics extractor, wherein each of the plurality of characteristics is associated with the characteristics model;
store each of the plurality of characteristics in a characteristics store using a schema,
wherein the characteristics extractor uses a characteristics store Application Programming Interface (API) to store each of the plurality of characteristics in the characteristics store, and
wherein the characteristics extractor is a front-end of a web-application comprising functionality to enable a user to request at least one action selected from a group consisting of adding, modifying, viewing, searching, and deleting an entry from the characteristics store; and
analyze a target system with respect to the interaction between the first domain and a second domain by issuing at least one query to the characteristics store to obtain an analysis result,
wherein the target system simultaneously executes the first domain and the second domain,
wherein the second domain comprises a second hardware component, a second software component, and a relationship between the second hardware component and the second software component, and
wherein the analysis result comprises at least one relationship between the first domain and the second domain, wherein the at least one relationship defines an interaction between the first domain and the second domain during the simultaneous execution of the first domain and the second domain.

* * * * *